US005266784A

United States Patent [19]

Trotta et al.

[11] Patent Number: 5,266,784

[45] Date of Patent: Nov. 30, 1993

[54] PROMOTIONAL SCANNING AND VALIDATING DEVICE

[75] Inventors: Frank Trotta, Maplewood; George Feldstein, Cuesskill, both of N.J.

[73] Assignee: Intermark Corporation, New York, N.Y.

[21] Appl. No.: 480,743

[22] Filed: Feb. 16, 1990

[51] Int. Cl.$^5$ ...................... G06F 15/04; G06F 15/44; B41J 1/60

[52] U.S. Cl. .................................... 235/375; 101/110; 235/380; 235/432; 364/410

[58] Field of Search ............... 235/375, 440, 493, 379, 235/380, 432, 454, 456, 460, 461, 462; 364/410, 411, 412; 400/162.3; 101/110; 194/217; 318/282

[56] References Cited

U.S. PATENT DOCUMENTS

| | | | |
|---|---|---|---|
| 2,224,646 | 12/1940 | Friedman et al. | 235/462 |
| 3,884,339 | 5/1975 | Castoldi et al. | 400/162.3 |
| 3,984,660 | 10/1976 | Oka et al. | 235/381 |
| 4,108,361 | 8/1978 | Kranse | 235/375 |
| 4,215,943 | 8/1980 | Lau | 400/162.3 |
| 4,335,339 | 6/1982 | Brickner | 318/282 |
| 4,491,726 | 1/1985 | Marmet | 235/458 |
| 4,526,264 | 7/1985 | MacNamara et al. | 194/217 |
| 4,677,533 | 6/1987 | Roberts et al. | 273/138 A |
| 4,709,630 | 12/1987 | Wilkens et al. | 101/110 |
| 4,788,419 | 11/1988 | Walters et al. | 235/381 |
| 4,884,906 | 12/1989 | Yamaguchi | 400/162.3 |

FOREIGN PATENT DOCUMENTS

| | | | |
|---|---|---|---|
| 0307925 | 3/1989 | European Pat. Off. . | |
| 2833618 | 2/1979 | Fed. Rep. of Germany . | |
| 3726936 | 2/1989 | Fed. Rep. of Germany . | |
| 8703539 | 6/1987 | PCT Int'l Appl. | 400/134 |
| 8706042 | 10/1987 | PCT Int'l Appl. . | |
| 662195 | 9/1987 | Switzerland . | |
| 0537245 | 12/1976 | U.S.S.R. | 400/163 |

*Primary Examiner*—Eugene R. LaRoche
*Assistant Examiner*—Christopher R. Glembocki
*Attorney, Agent, or Firm*—Hedman, Gibson & Costigan

[57] ABSTRACT

A promotional device requiring customer interaction is presented comprising a removable, tamper-resistant housing with a slot in the housing for accepting an encoded substrate. The substrate has a coded area and a validation area. An electromechanical assembly located within the housing comprises means for aligning the substrate, means for scanning the encoded area of the substrate, and means for validating the substrate in the validation area.

11 Claims, 5 Drawing Sheets

PROMOTIONAL SCANNING AND VALIDATING DEVICE

FIELD OF THE INVENTION

The present invention relates to promotional devices requiring customer interaction for determination of promotional prizes.

BACKGROUND OF THE INVENTION

Various promotional devices have been developed to promote products and services which require customer interaction. Some of these include devices the customer can participate in at home, i.e., scratch-off cards which reveal prizes or discounts, as well as devices for which a customer must be present to participate, i.e., mailing keys to customers who must bring them to location at which a locked trunk, car or, the like is kept.

It is an object of the present invention to provide an improved promotional device to attract customer participation at the promoter's location.

SUMMARY OF THE INVENTION

In accordance with the present invention, a promotional device requiring customer interaction is presented comprising a removable, tamper-resistant housing with a slot in said housing for accepting an encoded substrate, said substrate having a coded area and validation area, and an electromechanical assembly located within said housing comprising means for aligning said substrate, means for scanning said encoded area of said substrate and means for validating said substrate in said validation area.

The encoded substrate to be inserted by the customer can be any type of substrate including a metal, plastic or paper card or the like having a coded area and a validation area thereon. The code can be a bar type code or a magnetic code to be read by a moving scanner or an optical shaded area to be illuminated and read by fixed light sensors or scanners, or any other suitable code and reading or scanning device. The coded information can include whether the holder or customer has won a prize, and even what prize has been won, or merely the eligibility of the encoded substrate, i.e., eligibility based on a specified time period, a specific location, etc.

The electromechanical assembly includes means for aligning the substrate, means for scanning the encoded area of the substrate adapted to read the encoded portion of the substrate, means for processing the information and signaling a means for validating the substrate and means for validating the substrate in the validation area. The means for validating can be any known type including a stamping mechanism, a printer or other known marking means. The means for validating preferably includes means to allow several various markings to distinguish winning and losing participants as well as various prize levels.

The display housing can be used in conjunction with any known means of display to attract customer attention and should be capable of being securely, removably fixed to an object or within a supervised area to avoid unauthorized removal or tampering with the internal components.

BRIEF DESCRIPTION OF THE DRAWINGS

The following drawings, in which like reference characters indicate like parts, are illustrative of embodiments of the invention and are not intended to limit the scope of the invention in any manner whatsoever, as encompassed by the claims forming a part hereof.

DESCRIPTION OF THE PREFERRED EMBODIMENT

Figure 1:
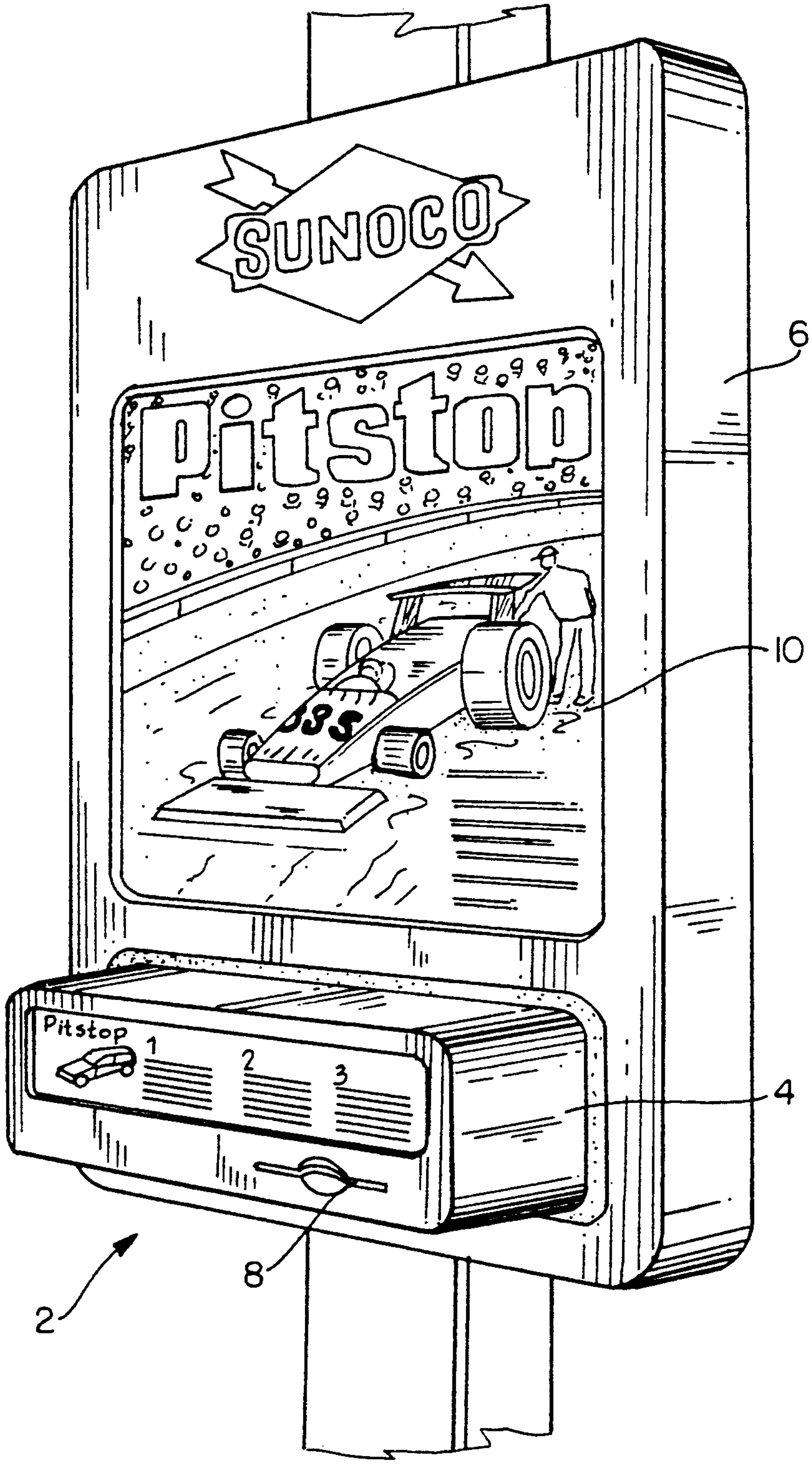
FIG. 1 is a perspective view of the promotional device of the present invention attached to a post.
Figure 2:
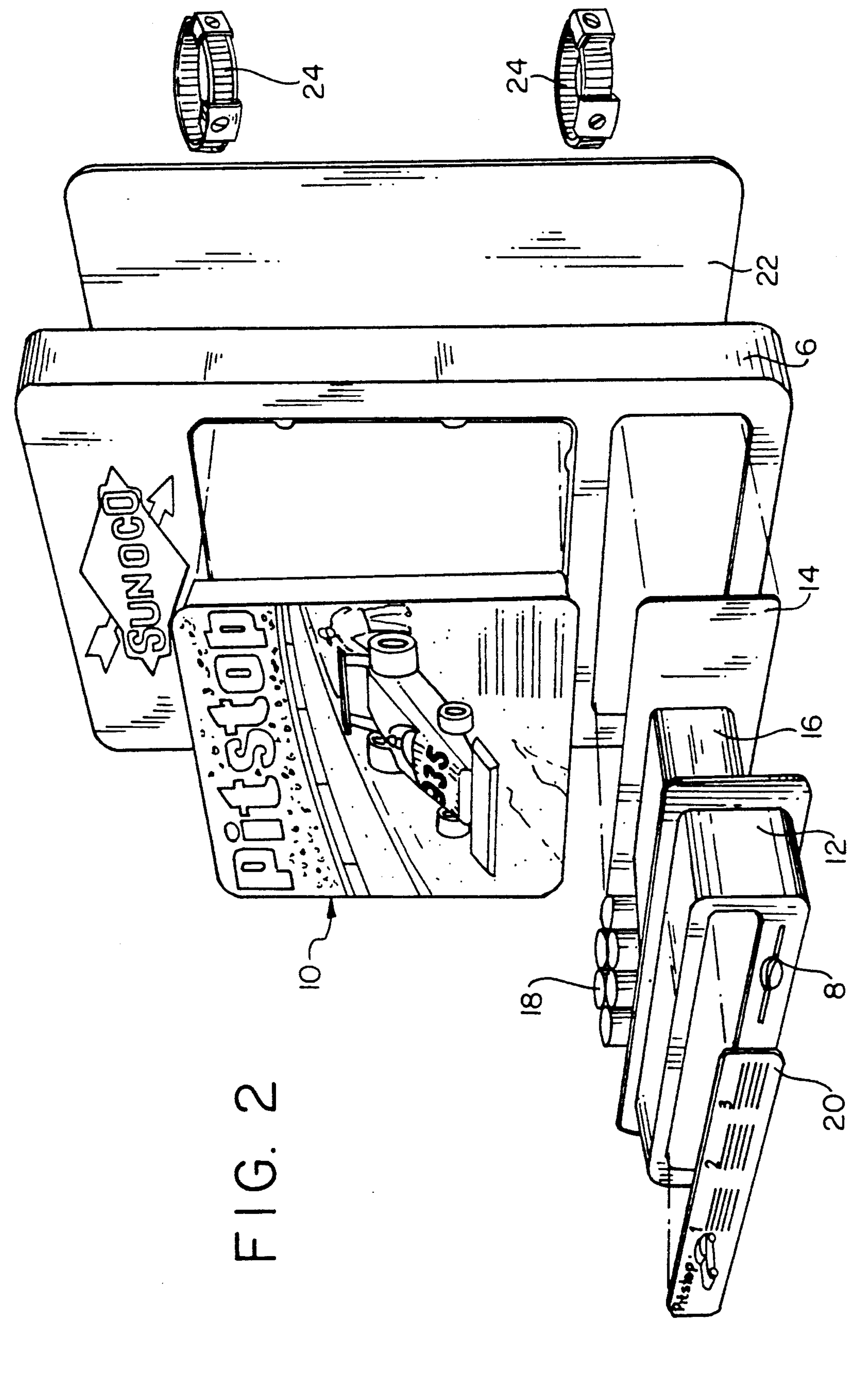
FIG. 2 is an exploded view of the promotional device of the present invention.

As shown in the drawings, and specifically FIGS. 1 and 2, the present invention comprises a promotional device 2 which is designed for customer interface to be located at a point of sale, etc.

The scanning and validating electromechanical assembly is located within a housing 4 which is shown mounted on a frame 6. Also mounted on the frame 6 is an optional game overlay poster 10. A slot 8 in the housing 4 is adapted to allow access of an encoded substrate, such as a card, to the electromechanical assembly within the housing 4. The electromechanical assembly 16 can then utilize means for scanning and means for validating the substrate to identify a winning customer.

As best shown in FIG. 2, the housing 4 is made up of an exposed housing faceplate 12 and a rear housing cover 14 which, when connected, enclose the electromechanical assembly 16.. A D.C. battery pack 18, which powers the electromechanical assembly 16 and allows operation of the device remote from an electrical power source, is also enclosed in the housing 4. An instruction card 20, or the like, is removably mounted on the faceplate 12.

The frame 6, optionally included to mount the housing 4, is provided with a structural back panel 22 which is attached to a column (As shown in FIG. 1) by tamper resistant mounting brackets 24 designed to avoid unauthorized removal of the device 2. Other display means include legs (not shown) attached to the back panel 22 to support the device 2 when placed on a countertop, etc. Although these types of display means are described, the method of display of the device 2 is not an essential part of the invention and any known means of display is intended to fall within the spirit and scope of the invention.

Figure 3:
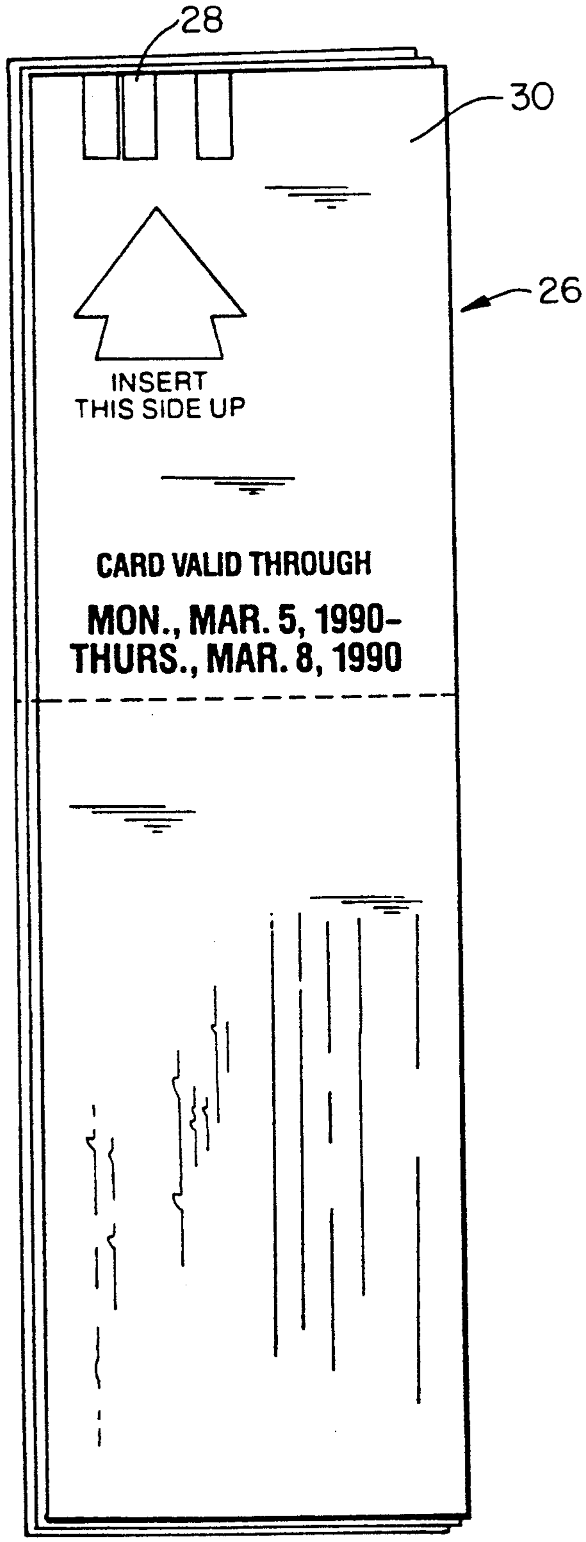
FIG. 3 is a front plan view of an encoded card to be "read" by the means for scanning forming a part of the electromechanical assembly located within the housing of the promotional device.

The encoded substrate to be placed in slot 8 by the customer can be virtually any encodable and encoded substrate having a validation area 30. As shown in FIG. 3 the preferred substrate is a card 26 having an encoded section 28 and a validation section 30. The encoded section 28 is encoded with a predetermined number of shaded or non-shaded segments forming an individual code.

Other types of codes and scanners can be used with the present invention including bar type codes or magnetic strips and corresponding readers or scanners, etc., without deviating herefrom. Of course, several coded sections 28 and/or a combination of codes can be used on a single card 26 or substrate.

In the preferred embodiment, the encoded card 26 shown in FIG. 3 is inserted into the slot 8 in the faceplate 12 of the housing 4. An internal structure 23 adapted to accept and properly align the card 26 in the electromechanical assembly 16, corresponding to the slot 8, positions the card 26 in the assembly 16 at a point where the coded section 28 is in proper relation to the card scanning means.

Figure 4:
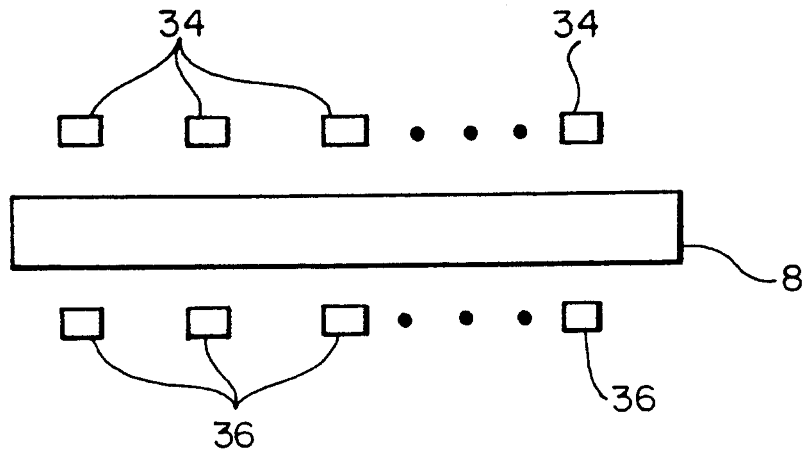
FIG. 4 is a front plan view of the substrate positioning and scanning means of one embodiment of the present invention.

The preferred card scanning means, shown in FIG. 4, comprises a number of infrared transmitters 34 corresponding to the predetermined number of shaded and non-shaded segments on the encoded section 28 of the card 26, positioned according to the location of the segments on the encoded section 28. Aligned opposite the infrared transmitters 34 on the other side of the properly positioned card 26 are phototransistors 36 which measure the amount of light radiation from the infrared transmitters 34 to determine whether the particular segment relating thereto is shaded or non-shaded. Depending on the number of shaded or non-shaded segments, a great number of combinations and coded information can be stored in the coded section 28 of the card 26.

A microcomputer 38 also located in the housing 4 and forming a part of the electromechanical assembly 16 processes the information from the coded area 28 of the card 26. As stated above, the information on the coded area 28 may merely contain information on the validity of the card, based on, i.e., the date, time, location, etc., with the prize chosen randomly, periodically or systematically, or the information on the coded area 28 may contain information on the validity of the card 26 and the prize won.

A port to the microcomputer 38 can be placed in the housing 4 to allow information to be removed or the program of the microcomputer 38 to be changed. When the validity deals with the time or date a clock is also provided as part of the electromechanical assembly 16.

When only the validity is encoded on the card 26, and the microcomputer 38 determines that the card 26 is valid, the mircrcomputer 38 performs a random, periodic or systematic generation to determine whether the customer has won a prize and what that prize will be. The microcomputer 38 then activates the validating means to mark the card 26 in the validation area 30. Similarly, when both the validity and prize are encoded on section 28 of the card 26, the scanning means reads the information and the microprocessor 38 determines the proper mark and activates the validating means to mark the code 26 in the validation area 30.

Figure 5:
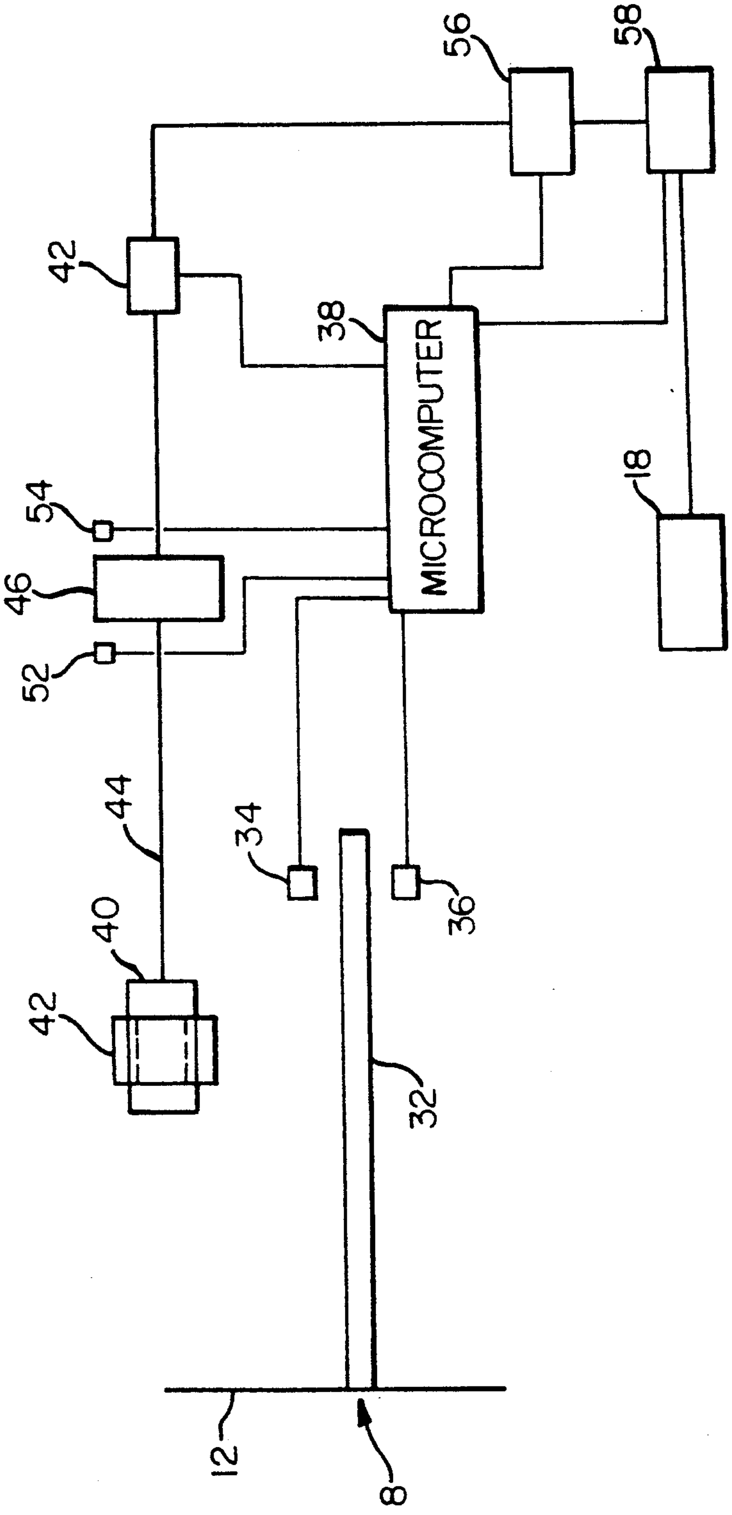
FIG. 5 is a schematic block diagram of the components of one embodiment of the electromechanical assembly.

The validating means located within the electromechanical assembly 16 can be any type of marking means including stamps, printers, or other markers. In the preferred embodiment shown in FIG. 5, the validation means comprises a replaceable rotating drum 40 having various stamp pads 42 relating to losing cards, winning cards and prizes available. Once the microcomputer 38 determines prize, a small D.C. electric motor 42 rotates the drum 40 on its axis 44 to the proper stamp pad 42.

Figure 6:
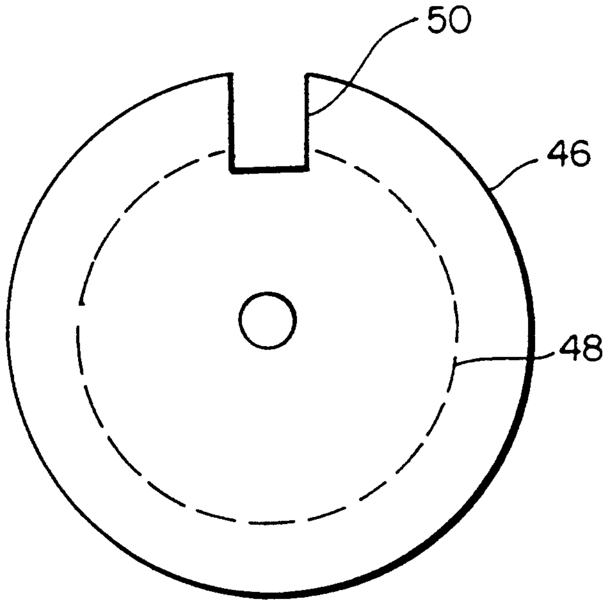
FIG. 6 is a front plan view of the slotted reference disc which cooperates with the position of the rotatable stamp drum in one embodiment of the present invention.

Precise positioning of the stamp pad 42 for contact with the validation area 30 is provided by the use of a motor 42 utilizing a four-quadrant positioning servo. A reference disc 46 (shown in FIG. 6) is attached to the axis 44 on which the stamp drum 40 rotates having slots 48 therein relating to proper alignment of the stamp pads 42 and an additional slot 50 provided as a reference.

One or more infrared transmitters 52 are located on one side of the reference disc 46 opposite a corresponding number of phototransistors 54 located on the other side of the disc 46. The positioning servo motor 42 rotates the stamp drum 40, and reference disc 46, in forward and reverse directions until a predetermined light radiation value is sensed by the phototransistor(s) 54. The slot 48 is positioned so that one-half of the light value of the infrared transmitter(s) 52, relates to precise placement of the stamp 42. Once this position is located, the drum 40 is locked into place.

The precisely aligned stamp pad 42 on the stamping drum 40, being locked into place, is moved into contact with the validation area 30 of the card by a second D.C. electric motor 56. By monitoring the current in the second motor 56 with a current monitor 58 the stamp can be placed with constant pressure and the motor 56 can back-off once a predetermined pressure is reached. This feature provides for proper and constant marks without the use of excess power, increasing battery life.

The electromechanical assembly 16 of the promotional device 2 also includes one or more flashing or operational lights or LEDs and a speaker (not shown) to audibly and visually signal winning and losing participants by tones or voice.

Liquid crystal displays in the faceplate 12 or voice instructions from a speaker provides for user interaction when a keypad is included with the device, hooked up to the electromechanical assembly 16. Prizes and prize levels are then determinable by the user's entry of, inter alia, answers to questions displayed on the LCD, or asked by voice, etc., entered by the customer on the keypad.

The housing 4, is removably attached to the frame 6 or other display area by tamper-resistant locking means which are not visable to the user. The blind locking means to attach the housing 4 to the frame 6 includes trapped hardware in tunnel openings which are operable only with special conforming tools. This allows removal of the assembly by authorized personnel during non-attended hours.

A gasket between the faceplate 12 and rear cover 14, as well as angled walls to shed water from openings, provides a water resistant housing 4 allowing for outdoor use of the device 2.

Obvious variations on the above invention will be apparent to one skilled in the art and are intended to fall within the spirit and scope of the present invention, limited only by the following claims.

We claim:

1. A self-contained promotional system requiring user interaction comprising a scanning and validating device and a coded substrate, said device comprising a tamper-resistant housing having a single slot therein to allow at least partial insertion and removal of said coded substrate, said substrate having a coded information section with coded information thereon and a validation section on the insertable portion, and an electromechanical assembly located within said housing wherein said electromechanical assembly comprises means for positioning said coded substrate when inserted into the slot in said housing, means for scanning the coded information section of said substrate comprising a predetermined number of phototransistors relating to an equal number of infrared transmitters positioned on opposing sides of an equal number of shaded or non-shaded segments of the coded information section of the substrate when properly positioned in the electromechanical assembly, a microcomputer for determining whether a substrate is valid and a prize is to be awarded based on the coded information, means for validating said substrate in said validation area, comprising a rotatable drum on which a series of stamp pads are located, the stamp pad being brought into contact with the validation section of the substrate by a D.C. electric motor and further comprising means for monitoring the current in the D.C. electric motor and reversing said motor once a predetermined change in current has been sensed relating to the pressure of the stamp pad on the substrate, and at least one D.C. battery which powers the components of the electromechanical assembly.

2. A promotional system as defined in claim 1 wherein the encoded substrate is a card taken from the group comprising paper cards, plastic cards, plastic coated paper cards.

3. A promotional system as defined in claim 1 wherein the rotatable drum is rotated by rotating means about an axis on which a reference disc is attached, said reference disc having reference marks relating to the position of the stamp pads on said stamp drum, further comprising position scanning means for scanning the position of said reference marks and means for precisely positioning said stamp pads.

4. A promotional system as defined in claim 3 wherein said reference marks are slots, the edges of said slots being scanned by said position scanning means.

5. A promotional system as defined in claim 4 wherein said position scanning means comprises at least one infrared transmitter on one side of said reference disc in relation to the location of the slots corresponding to at least one phototransistor on the opposing side of said reference disc.

6. A promotional system as defined in claim 3 wherein the rotating means comprises a D.C. electric motor.

7. A promotional system as defined in claim 3 wherein said means for precisely positioning said stamp pad is a four-quadrant positioning servo.

8. A promotional system as defined in claim 1 wherein the means to communicate with the user is taken from the group comprising speakers, liquid crystal displays and light emitting diodes.

9. A promotional system as defined in claim 1 further comprising a keypad for interaction by the user.

10. A promotional system as defined in claim 1 further comprising means for attachment to a display comprising blind, tamper-resistant attachments which allow for removal of the device from said display.

11. A promotional system as defined in claim 1 wherein the coded information in the coded information section of the coded substrate further includes information on the prize to be awarded.

* * * * *